US009811492B2

(12) United States Patent
Bhatia et al.

(10) Patent No.: US 9,811,492 B2
(45) Date of Patent: Nov. 7, 2017

(54) SYSTEM AND METHOD FOR PROVIDING INTERNAL SYSTEM INTERFACE-BASED BRIDGING SUPPORT IN MANAGEMENT CONTROLLER

(71) Applicant: American Megatrends, Inc., Norcross, GA (US)

(72) Inventors: Anurag Bhatia, Lilburn, GA (US); Samvinesh Christopher, Suwanee, GA (US); Winston Thangapandian, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 160 days.

(21) Appl. No.: 14/819,315

(22) Filed: Aug. 5, 2015

(65) Prior Publication Data

US 2017/0039157 A1   Feb. 9, 2017

(51) Int. Cl.
  *G06F 13/12*   (2006.01)
  *G06F 13/40*   (2006.01)
  *G06F 13/42*   (2006.01)
  *G06F 13/362*  (2006.01)

(52) U.S. Cl.
  CPC ........ *G06F 13/4027* (2013.01); *G06F 13/362* (2013.01); *G06F 13/4282* (2013.01)

(58) Field of Classification Search
  CPC .............................. H04L 43/0817; G06F 15/76
  USPC ........................................................ 710/105
  See application file for complete search history.

(56) References Cited

U.S. PATENT DOCUMENTS

| | | | |
|---|---|---|---|
| 2008/0126852 A1* | 5/2008 | Brandyberry | G06F 11/0787 714/6.13 |
| 2008/0278508 A1 | 11/2008 | Anderson | |
| 2013/0117766 A1* | 5/2013 | Bax | G06F 9/4405 719/323 |
| 2013/0151646 A1* | 6/2013 | Chidambaram | H04L 47/6205 709/213 |
| 2013/0346666 A1* | 12/2013 | Chang | G06F 13/20 710/313 |

(Continued)

*Primary Examiner* — Titus Wong
(74) *Attorney, Agent, or Firm* — Locke Lord LLP; Tim Tingkang Xia, Esq.

(57) ABSTRACT

Certain aspects direct to systems and methods for providing internal system interface-based bridging support in a server management device. The system includes a server management device and a satellite controller. The server management device has an Intelligent Platform Management Interface (IPMI) stack and a management service module. The management service module, when executed, provides a corresponding management service. Further, a satellite communication is established between the IPMI stack and the satellite controller through a satellite control interface, such as an IPMB interface. In operation, the server management device defines an internal system interface, and configures the internal system interface to establish an inter-process communication (IPC) channel between the IPMI stack and the management service using the internal system interface. Thus, an internal communication may be performed through the IPC channel, enabling a bridging communication between the management service and the satellite controller by the internal communication and the satellite communication.

20 Claims, 4 Drawing Sheets

(56) References Cited

U.S. PATENT DOCUMENTS

2014/0122833 A1* 5/2014 Davis ................ G06F 15/7803
                                                        712/29
2014/0195704 A1    7/2014 Bhatia
2015/0220411 A1    8/2015 Shivanna

* cited by examiner

SYSTEM AND METHOD FOR PROVIDING INTERNAL SYSTEM INTERFACE-BASED BRIDGING SUPPORT IN MANAGEMENT CONTROLLER

CROSS-REFERENCE TO RELATED PATENT APPLICATION

This application relates to co-pending U.S. patent application Ser. No. 14/819,230, entitled "SYSTEM AND METHOD FOR PERFORMING INTERNAL SYSTEM INTERFACE-BASED COMMUNICATIONS IN MANAGEMENT CONTROLLER" and filed on Aug. 5, 2015. The entire content of the above identified applications are incorporated herein by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to server management technology, and more particularly to systems and methods for providing internal system interface-based bridging support in management controllers.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Intelligent Platform Management Interface (IPMI) is an industry standard for system monitoring and event recovery. Currently, baseboard management controller (BMC) chips fully support the IPMI Specification version 2.0 (hereinafter the IPMI v2.0), which is publicly available from INTEL CORPORATION, and is incorporated herein by reference. The IPMI v2.0 provides a common message-based interface for accessing all of the manageable features in a compatible computer.

Generally, a typical server management controller stack has an IPMI stack running at its core to serve the direct IPMI requests. Meanwhile, the server management controller stack may have additional management services. Practically, when the server management controller is connected to one or more satellite controllers, there is a need for communication between any of the management services to the satellite controllers. However, the IPMI Specification does not define any internal interface to send bridging request to the satellite controllers.

Therefore, an unaddressed need exists in the art to address the aforementioned deficiencies and inadequacies.

SUMMARY

Certain aspects of the disclosure direct to a system, which includes a server management device and at least one satellite controller communicatively connected to the server management device through a satellite control interface. In certain embodiments, the server management device includes a processor and a storage device storing an Intelligent Platform Management Interface (IPMI) stack, at least one management service module, and computer executable code. Each of the at least one management service module, when executed at the processor, is configured to provide a corresponding management service. Further, a satellite communication is established between the IPMI stack and the at least one satellite controller through the satellite control interface. The computer executable code, when executed at the processor, is configured to: define an internal system interface, and configure the internal system interface to establish an inter-process communication (IPC) channel between the IPMI stack and the management service using the internal system interface; and perform internal communication between the IPMI stack and the management service through the IPC channel to enable a bridging communication between the management service and the at least one satellite controller via the IPMI stack by the internal communication and the satellite communication.

In certain embodiments, the server management device is a baseboard management controller (BMC).

In certain embodiments, the satellite control interface is an Intelligent Platform Management Bus (IPMB) interface.

In certain embodiments, the internal system interface is a Unix domain socket (UDS) or an IPC socket.

In certain embodiments, the management service is a service providing at least one out-of band (OOB) functionality for the server management device.

In certain embodiments, the management service is a web server service, a keyboard, video and mouse (KVM) service, a Common Information Model (CIM) service, a Systems Management Architecture for Server Hardware (SMASH) service, or a combination thereof.

In certain embodiments, the computer executable code includes: a configuration module configured to define the internal system interface and configure the internal system interface to establish the IPC channel; and an internal communication module configured to perform the internal communication between the IPMI stack and the management service through the IPC channel.

In certain embodiments, the configuration module is configured to configure the internal system interface to establish IPC channel by referencing the IPC channel with an IPC file, such that the IPC channel is accessible by the IPMI stack and the management service.

In certain embodiments, the IPC channel is accessible by the IPMI stack and the management service as a file system, wherein the file system includes a first file location representing the IPMI stack and a second file location representing the management device.

In certain embodiments, the bridging communication includes: receiving, by the internal communication module, a bridging command directed to the at least one satellite controller from the management service, wherein the bridging command includes first data to be directed to the at least one satellite controller; extracting, by the IPMI stack, the first data from the bridging command; and transmitting, by the IPMI stack, the first data to the satellite controller through the satellite control interface. In certain embodiments, the bridging communication further includes: receiving, by the IPMI stack, second data in response to the first data from the satellite controller through the satellite control interface; constructing, by the internal communication module, a response to the bridging command based on the second data; and transmitting, by the internal communication module, the response to the management service in response to the bridging command.

Certain aspects of the disclosure direct to a method for providing internal system interface-based bridging support in a server management device. In certain embodiments, the method includes: defining, by the server management device, an internal system interface, and configuring the internal system interface to establish an inter-process communication (IPC) channel between an Intelligent Platform Management Interface (IPMI) stack and at least one management service within the server management device using the internal system interface, wherein the at least one management service is provided by executing at least one management service module in the server management device; and performing, by the server management device, an internal communication between the IPMI stack and the at least one management service through the IPC channel to enable a bridging communication between the management service and at least one satellite controller via the IPMI stack by the internal communication and a satellite communication between the IPMI stack and the at least one satellite controller. The at least one satellite controller is communicatively connected to the server management device through a satellite control interface, and the satellite communication is established between the IPMI stack and the at least one satellite controller through the satellite control interface.

In certain embodiments, the server management device is a BMC. In certain embodiments, the satellite control interface is an IPMB interface. In certain embodiments, the internal system interface is a UDS or an IPC socket. In certain embodiments, each of the at least one management service is a service providing at least one OOB functionality for the server management device, and wherein the at least one management service is a web server service, a KVM service, a CIM service, a SMASH service, or a combination thereof.

In certain embodiments, the internal system interface is configured to establish IPC channel by referencing the IPC channel with an IPC file, such that the IPC channel is accessible by the IPMI stack and the management service.

In certain embodiments, the IPC channel is accessible by the IPMI stack and the management service as a file system, wherein the file system includes a first file location representing the IPMI stack and a second file location representing the management device.

In certain embodiments, the bridging communication includes: receiving, by an internal communication module of the server management device, a bridging command directed to the at least one satellite controller from the management service, where the bridging command includes first data to be directed to the at least one satellite controller; extracting, by the IPMI stack, the first data from the bridging command; and transmitting, by the IPMI stack, the first data to the satellite controller through the satellite control interface. In certain embodiments, the bridging communication further includes: receiving, by the IPMI stack, second data in response to the first data from the satellite controller through the satellite control interface; constructing, by the internal communication module, a response to the bridging command based on the second data; and transmitting, by the internal communication module, the response to the management service in response to the bridging command.

Certain aspects of the disclosure direct to a non-transitory computer readable medium storing an IPMI stack, at least one management service module, and computer executable code. In certain embodiments, the code, when executed at a processor of a server management device, is configured to: define an internal system interface, and configure the internal system interface to establish an IPC channel between the IPMI stack and at least one management service within the server management device using the internal system interface, wherein the at least one management service is provided by executing at least one management service module at the processor of the server management device; and perform an internal communication between the IPMI stack and the at least one management service through the IPC channel to enable a bridging communication between the management service and at least one satellite controller via the IPMI stack by the internal communication and a satellite communication between the IPMI stack and the at least one satellite controller. The at least one satellite controller is communicatively connected to the server management device through a satellite control interface, and the satellite communication is established between the IPMI stack and the at least one satellite controller through the satellite control interface.

In certain embodiments, the server management device is a BMC. In certain embodiments, the satellite control interface is an IPMB interface. In certain embodiments, the internal system interface is a UDS or an IPC socket. In certain embodiments, each of the at least one management service is a service providing at least one OOB functionality for the server management device, and wherein the at least one management service is a web server service, a KVM service, a CIM service, a SMASH service, or a combination thereof.

In certain embodiments, the computer executable code includes: a configuration module configured to define the internal system interface and configure the internal system interface to establish the IPC channel; and an internal communication module configured to perform the internal communication between the IPMI stack and the management service through the IPC channel.

In certain embodiments, the configuration module is configured to configure the internal system interface to establish IPC channel by referencing the IPC channel with an IPC file, such that the IPC channel is accessible by the IPMI stack and the management service.

In certain embodiments, the IPC channel is accessible by the IPMI stack and the management service as a file system, wherein the file system includes a first file location representing the IPMI stack and a second file location representing the management device.

In certain embodiments, the bridging communication includes: receiving, by the internal communication module, a bridging command directed to the at least one satellite controller from the management service, wherein the bridging command includes first data to be directed to the at least one satellite controller; extracting, by the IPMI stack, the first data from the bridging command; and transmitting, by the IPMI stack, the first data to the satellite controller through the satellite control interface. In certain embodiments, the bridging communication further includes: receiving, by the IPMI stack, second data in response to the first data from the satellite controller through the satellite control interface; constructing, by the internal communication module, a response to the bridging command based on the second data; and transmitting, by the internal communication module, the response to the management service in response to the bridging command.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The terms "node" or "computing node", as used herein, generally refer to a basic unit of computer systems. A node may be implemented by a physical device or a virtual device. For example, a computing device such as a personal computer, a laptop computer, a tablet or a mobile device may function as a node. A peripheral device such as a printer, a scanner or a system on chip (SoC) may also function as a node. A virtual device, such as a virtual machine (VM), may also function as a node. When defining nodes on the Internet, a node refers to a device or a data point having an IP address.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Certain aspects of the present disclosure direct to systems and methods for providing internal system interface-based bridging support in a server management device. As discussed above, a typical server management controller stack has an IPMI stack running at its core to serve the direct IPMI requests. The IPMI Specification defines standard BMC in-band interfaces, such as a keyboard controller style (KCS) interface, a block transfer (BT) interface, and a server management interface chip (SMIC), for the host to BMC communications. Further, the IPMI Specification also defines out-of band (OOB) session based interfaces, such as the local area network (LAN), the Intelligent Platform Management Bus (IPMB) interface, and other serial interface or ports. Generally, a satellite controller may be connected to the server management device through the IPMB interface, such that the IPMI stack may provide bridging support to through the LAN or other external interfaces, enabling a computing device to communicate with the satellite controller. However, the IPMI Specification does not define any internal interface to the BMC for the management services to communicate with the IPMI stack. Thus, these management services do not enjoy the bridging support functionalities provided by the IPMI stack to communicate with the satellite controller. To solve the deficiency, certain embodiments of the present disclosure provide systems and methods to implement a software-implemented internal system interface to fulfill the need for internal communication between the management services and the IPMI stack within the server management controller stack, thus enabling the bridging support functionalities provided by the IPMI stack to be provided to the management services.

Figure 1:
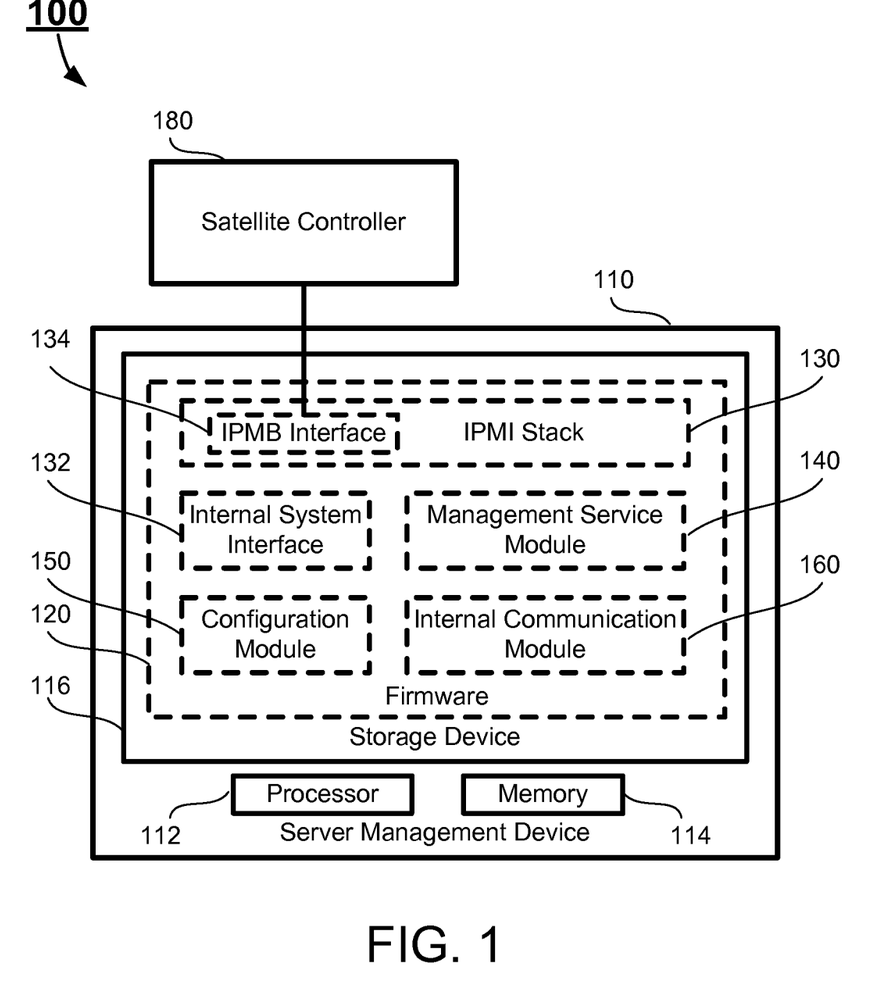
FIG. 1 schematically depicts an exemplary system according to certain embodiments of the present disclosure.

FIG. 1 schematically depicts an exemplary system according to certain embodiments of the present disclosure. The system 100 is capable of performing internal system interface-based communications in a server management device. As shown in FIG. 1, the system 100 includes a server management device 110 and a satellite controller 180. Although not explicitly shown in FIG. 1, the server management device 110 may be communicatively connected to one or more computing devices (not shown) via a network or any other in-band or OOB interfaces, such as the KCS, BT, SMIC interfaces, the LAN or other serial interfaces. For example, one of the computing devices may function as a host computer of the server management device 110, and other computing devices may function as the servers controlled by the server management device 110. In certain embodiments, the network may be a wired or wireless network, and may be of various forms, such as a public network and a private network. Examples of the network may include, but not limited to, the LAN or a wide area network (WAN) including the Internet. In certain embodiments, two or more different networks and/or interfaces may be applied to connect the server management device 110 to the computing devices.

The server management device 110 is a management controller to control a plurality of servers or services. In certain embodiments, the server management device 110 may be implemented by a system on chip (SoC), such as a BMC or a service processor (SP), or by other management controllers.

Further, the satellite controller 180 is a management controller outside the server management device 110. Generally, the management functions may be distributed among multiple system modules, including the server management device 110 as a main controller, and the satellite controller 180 as additional controller. In certain embodiments, the satellite controller 180 may be communicatively connected to the server management device 110 through a satellite control interface, such as the IPMB interface 134 as shown in FIG. 1. In certain embodiments, the system 100 may include multiple satellite controllers 180 respectively connected to the server management device 110 through the IPMB interface 134.

In certain embodiments, the server management device 110 and the satellite controller 180 may include necessary hardware and software components to perform certain predetermined tasks. For example, as shown in FIG. 1, the server management device 110 includes a processor 112, a memory 114, and a storage device 116. Further, the server management device 110 may include other hardware components and software components (not shown) to perform its corresponding tasks. Examples of these hardware and software components may include, but not limited to, other required memory, interfaces, buses, Input/Output (I/O) modules and peripheral devices. In certain embodiments, although not explicitly shown in FIG. 1, the satellite controller 180 may include hardware and software components similar to the server management device 110.

The processor 112 is configured to control operation of the server management device 110. In certain embodiments, the processor 112 may be a central processing unit (CPU). The processor 112 can execute any computer executable code or instructions, such as the firmware 120 of the server management device 110 or other applications and instructions of the server management device 110. In certain embodiments, the server management device 110 may run on more than one processor, such as two processors, four processors, eight processors, or any suitable number of processors.

The memory 114 can be a volatile memory, such as the random-access memory (RAM), for storing the data and information during the operation of the v server management device 110. In certain embodiments, the memory 114 may be a volatile memory array.

The storage device 116 is a non-volatile data storage media for storing the applications of the server management device 110. Examples of the storage device 116 may include non-volatile memory such as flash memory, memory cards, USB drives, hard drives, floppy disks, optical drives, or any other types of data storage devices. In certain embodiments, the server management device 110 may have multiple storage devices 116, which may be identical storage devices or different types of storage devices, and the applications may be stored in one or more of the storage devices 116 of the server management device 110.

As shown in FIG. 1, the storage device 116 of the server management device 110 stores a firmware 120, which may include, among other things, an IPMI stack 130, an internal system interface 132, a management service module 140, a configuration module 150, and an internal communication module 160. In certain embodiments, the firmware 120 may store other applications necessary for the operation of the server management device 110. It should be noted that the stacks and modules of the firmware 120 are each implemented by computer executable codes or instructions, which collectively forms the firmware 120. In certain embodiments, each of the stacks and modules may further include sub-stacks or sub-modules. Alternatively, some of the stacks and modules may be combined as one stack.

The IPMI stack 130 provides IPMI functionalities for the server management device 110. For example, the IPMI stack 130 may be used to process an IPMI message, or provide bridging support functionalities. In certain embodiments, the IPMI stack 130 may be in communication with the computing devices through the in-band or OOB functions defined by the IPMI Specification. For example, the IPMI stack 130 may communicate with a host computer through the KCS, BT or SMIC interfaces, or may communicate with a remote computing device through LAN. In certain embodiments, a satellite communication may be established between the IPMI stack 130 and the satellite controller 180 through the IPMB interface 134, which functions as a satellite control interface, such that the IPMI stack 130 may communicate with the satellite controller through the IPMB interface 134.

The internal system interface 132 is a software-implemented internal interface implemented by the configuration module 150 and the internal communication module 160 for the purpose of performing an internal communication between the IPMI stack 130 and the management service 140. In other words, the internal system interface 132 is a part of an extension of the IPMI stack 130 to allow the internal communication to the management service 140. In certain embodiments, the internal system interface 132 may be a Unix domain socket (UDS) or an IPC socket.

The UDS or IPC socket is a data communications endpoint for exchanging data between processes executing within the same host operating system. The UDS supports transmission of a reliable stream of bytes (SOCK_STREAM, compare to TCP), and additionally supports ordered and reliable transmission of datagrams (SOCK_SEQPACKET), or unordered and unreliable transmission of the same (SOCK_DGRAM, compare to UDP). The UDS facility is a standard component of POSIX operating systems. The application programming interface (API) for UDS is similar to that of an Internet socket, but rather than using an underlying network protocol, all communication occurs entirely within the operating system kernel. Generally, the UDS uses the file system as its address name space, and may be referenced by processes as an index node (generally referred to as an "inode") in the file system. This allows two processes to open the same socket in order to communicate.

The management service module 140 is a module which, when executed at the processor 112, is configured to provide a corresponding management service instance (hereinafter the management service). In certain embodiments, a management service is generally a service not provided by the IPMI stack 130 and not covered or defined by the IPMI Specification. In other words, the management service may be a non-IPMI service. In certain embodiments, the management service provides one or more OOB functionalities for the server management device 110 since it is not covered by IPMI and may operate independently from the operation of the IPMI stack 130. Examples of the management service may include, without being limited to, a web server service, a keyboard, video and mouse (KVM) service, a Common Information Model (CIM) service, a Systems Management Architecture for Server Hardware (SMASH) service. In certain embodiments, the firmware 120 may include multiple management service modules 140, and each of the management service modules 140, when executed, may provide a corresponding management service, and all the management services provided in one server management device 110 may be independent and different from one another. For example, the web server, KVM, CIM and SMASH services may all be provided in one single server management device 110 at the same time.

The configuration module 150 and the internal communication module 160 are extensions of the IPMI stack 130 to implement the internal communication between the IPMI stack and the management service. Specifically, the configuration module 150 is configured to define the internal system interface 132, and configure the internal system interface 132 to establish an IPC channel, which is a bi-directional channel, between the IPMI stack 130 and the management service using the internal system interface 132. In certain embodiments, the configuration module 150 may include an IPC file which contains the information for configuring the internal system interface to establish the IPC channel. In operation, the configuration module 150 may establish the IPC channel by referencing with the IPC file, such that the IPC channel is accessible by the IPMI stack 130 and the management service. For example, when the internal system interface 132 is the UDS, the UDS may use the file system as its address name space, and may be referenced by processes as an mode in the file system. Thus, when the configuration module 150 establishes the IPC channel, the configuration module 150 refer to the IPC file such that the IPC channel is accessible by the IPMI stack 130 and the management service as a file system, which may include a first file location representing the IPMI stack 130 and a second file location representing the management device. Thus, the internal communication between the IPMI stack 130 and the management service may be established within the server management device 110.

The internal communication module 160 is configured to perform an internal communication between the IPMI stack 130 and the management service through the IPC channel. In certain embodiments, when the management service sends data directed to the IPMI stack 130 through the IPC channel, the internal communication module 160 receives the data, and forwards the data to the IPMI stack 130. Further, when the IPMI stack 130 sends a response to the data sent by the management service, the internal communication module 160 receives the response, and forwards the response to the management service.

Figure 2:
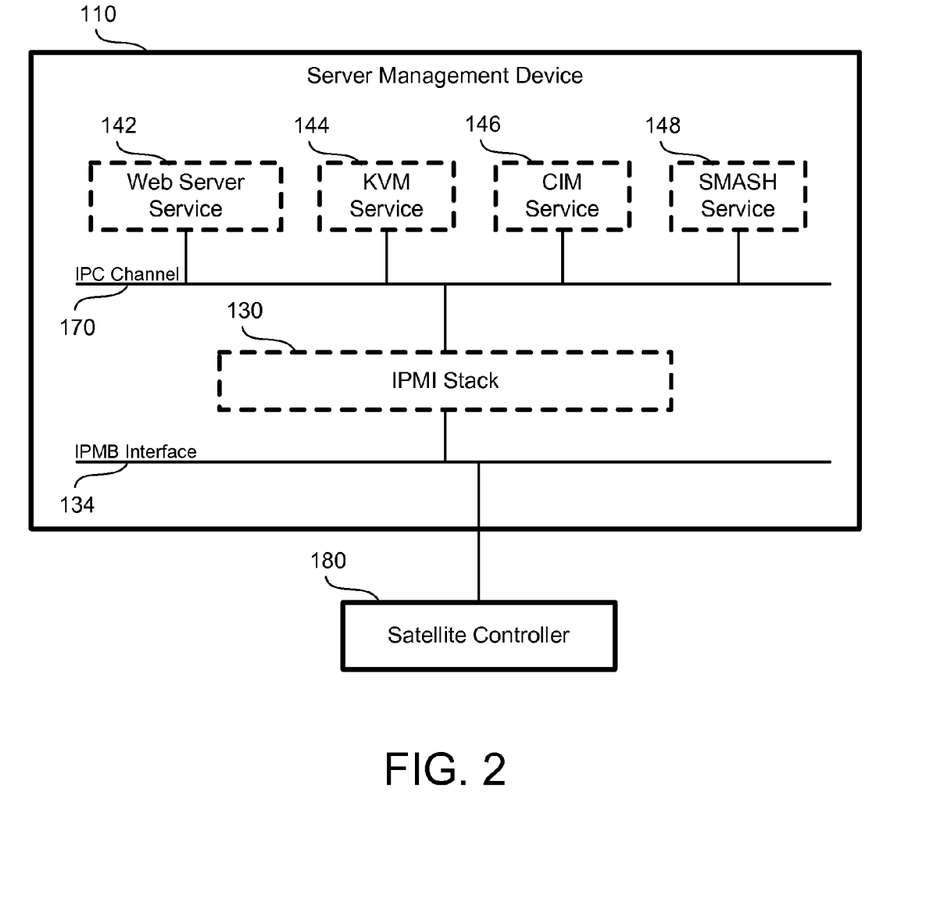
FIG. 2 schematically depicts an internal communication between the IPMI stack and the management services according to certain embodiments of the present disclosure.

FIG. 2 schematically depicts an internal communication between the IPMI stack and the management services according to certain embodiments of the present disclosure. As shown in FIG. 2, the top part of the figure shows the internal communication within the server management device 110, and the bottom part of the figure shows the satellite communication between the IPMI stack 130 and the satellite controller 180.

As shown in FIG. 2, the server management device 110 provides multiple management services, including the web server service 142, the KVM service 144, the CIM service 146 and the SMASH service 148. As disclosed above, the configuration module 150 may define the internal system interface 132 (such as the UDS or IPC socket), and then establish the IPC channel 170 using the internal system interface 132, thus enabling the internal communication between the IPMI stack 130 and the management services. All the management services, including the web server service 142, the KVM service 144, the CIM service 146 and the SMASH service 148, or any other management services provided by the same server management device 110, may communicate with the IPMI stack 130 through the IPC channel 170 with the help of the internal system interface 132. Further, the IPMI stack 130 may communicate to the satellite controller 180 through the IPMB interface 134 (i.e., the satellite interface). Thus, a bridging communication may be established between the management service and the satellite controller 180 via the IPMI stack 130 by the internal communication and the satellite communication.

As disclosed above, the IPMI stack 130 provides the IPMB interface 134, which may function as a satellite control interface to enable a satellite communication between the IPMI stack 130 and the satellite controller 180 through the IPMB interface 134. Thus, once the internal communication between the IPMI stack 130 and the management service is established through the IPC channel, a bridging communication may be established between the management service and the satellite controller 180 via the IPMI stack 130 by the internal communication and the satellite communication.

For example, the web server service 142 may contain a web page for displaying information of the satellite controller 180. To obtain the information of the satellite controller 180, the web server service 142 may send a bridging command to the IPMI stack 130 through the IPC channel 170 to retrieve the information of the satellite controller 180. The bridging command must contain data that is to be directed to the satellite controller 180, and the information indicating the satellite controller 180 to be the destination of the data, such that the IPMI stack 130 may recognize the destination of the bridging command to be the satellite controller 180. In this example, the data to be directed to the satellite controller 180 includes a request command for certain information of the satellite controller 180. Once the internal communication module 160 receives the bridging command, the internal communication module 160 forwards the request command to the IPMI stack 130. In certain embodiments, the bridging command may include an IPMI message which is encapsulated in a different format not recognizable by the IPMI stack 130. In this case, the internal communication module 160 may extract the IPMI message recognizable by the IPMI stack 130 from the bridging command, and then send the extracted IPMI message to the IPMI stack 130.

The IPMI stack 130 then extracts the data to be sent to the satellite controller 180 from the first bridging command, and then sends the data to the satellite controller through the IPMB interface 134 (i.e., the satellite control interface). Upon receiving the data, the satellite controller 180 retrieves the information being requested based on the request command of the data, and sends the information to the IPMI stack 130 through the IPMB interface 134. Upon receiving the information, the IPMI stack 130 may forward the information to the internal communication module 160. Then the internal communication module constructs a response to the bridging command based on the information, and then sends the response back to the web server service 142 through the IPC channel 170. Thus, the web server service 142 may obtain the necessary information to be displayed on the web page.

A further aspect of the present disclosure is directed to a method for performing internal system interface-based communications in a server management device. In certain embodiments, the method may be implemented on a system as shown in FIG. 1.

Figure 3:
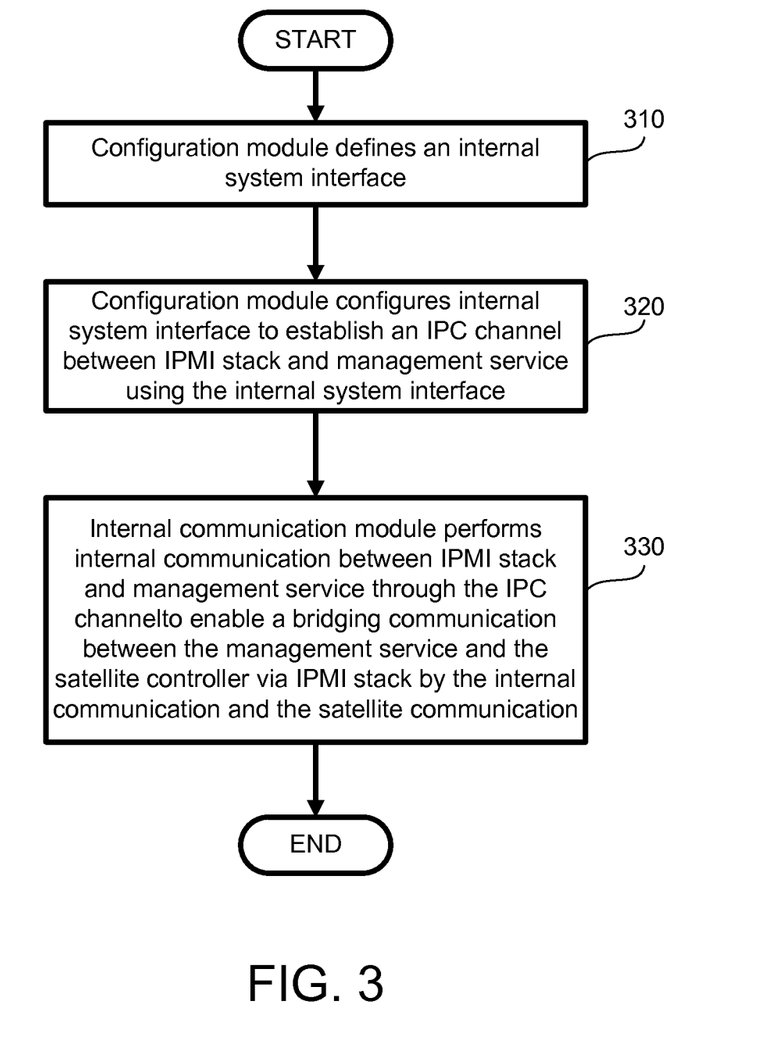
FIG. 3 depicts a flowchart showing a method for providing internal system interface-based bridging support in a server management device according to certain embodiments of the present disclosure.

FIG. 3 depicts a flowchart showing a method for providing internal system interface-based bridging support in a server management device according to certain embodiments of the present disclosure. In this embodiment, only one management service is provided by the server management device to communicate with the IPMI stack. When the server management device provides multiple management services may perform internal system interface-based communications with the IPMI stack.

At procedure 310, the configuration module 150 defines an internal system interface 132, such as a UDS or IPC socket. At procedure 320, the configuration module 150 configures the internal system interface 132 to establish an IPC channel 170 between the IPMI stack 130 and the management service using the internal system interface 132. Thus, at procedure 330, the internal communication module 330 may be capable of performing the internal communication between the IPMI stack 130 and the management service through the IPC channel 170, thus enabling a bridging communication between the management service and the satellite controller 180 via the IPMI stack 130 by the internal communication and the satellite communication.

Figure 4:
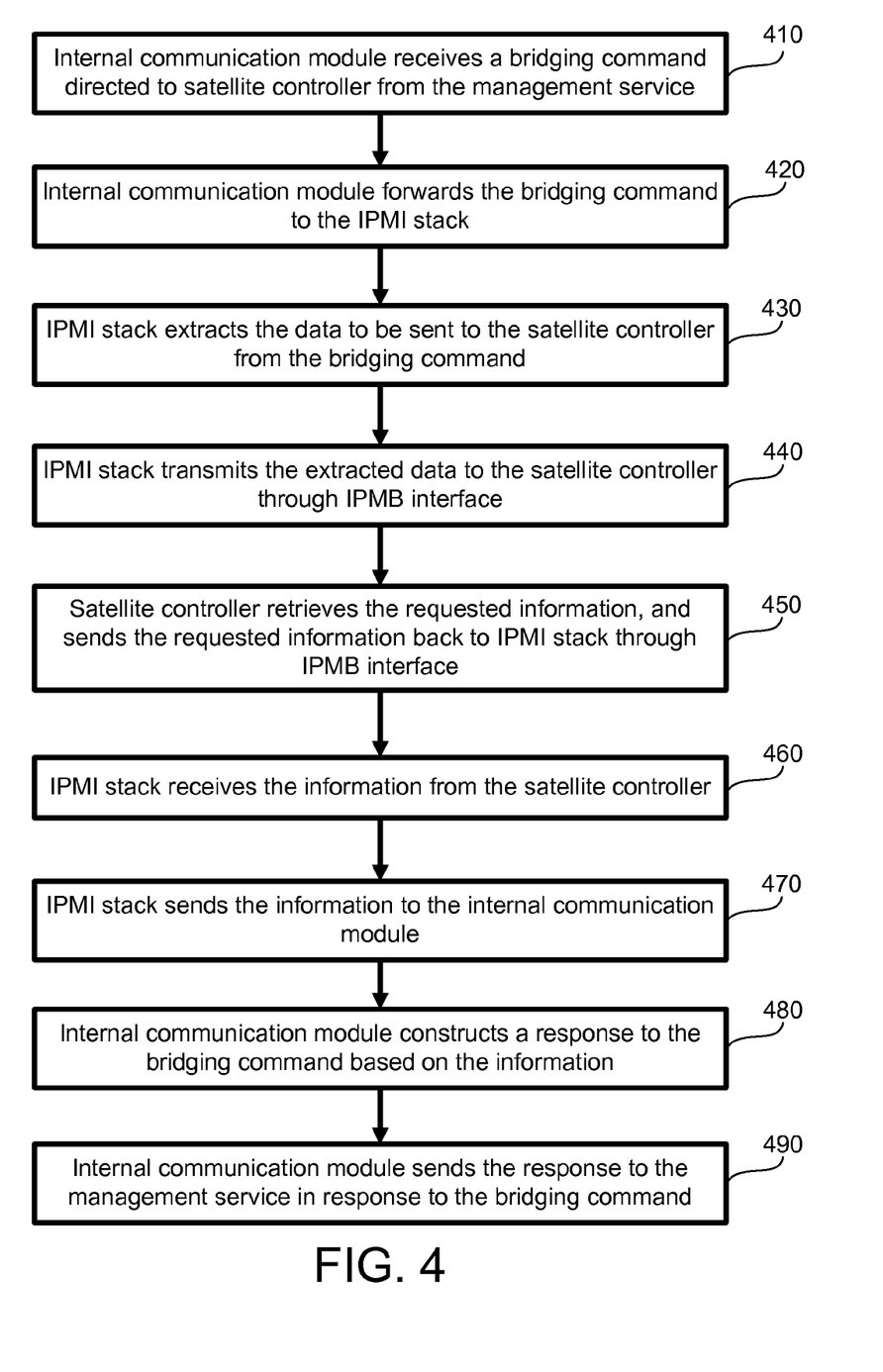
FIG. 4 depicts a flowchart showing a bridging communication according to certain embodiments of the present disclosure.

FIG. 4 depicts a flowchart showing a bridging communication according to certain embodiments of the present disclosure. In this embodiment, only one management service is provided by the server management device to communicate with the IPMI stack. When the server management device provides multiple management services may perform internal system interface-based communications with the IPMI stack.

At procedure 410, the internal communication module 150 receives a bridging command directed to the satellite controller 180 from the management service. The bridging command includes data to be directed to the satellite controller 180 and information indicating the satellite controller 180 as the destination of the data. In certain embodiments, the data may be a request command to certain information of the satellite controller 180.

At procedure 420, the internal communication module 150 forwards the bridging command to the IPMI stack 130. In certain embodiments, the bridging command may include an IPMI message which is encapsulated in a different format not recognizable by the IPMI stack 130. In this case, the internal communication module 160 may extract the IPMI message recognizable by the IPMI stack 130 from the bridging command, and then send the extracted IPMI message to the IPMI stack 130.

At procedure 430, the IPMI stack 130 extracts the data to be sent to the satellite controller 180 from the bridging command. Then, at procedure 440, the IPMI stack 130 transmits the extracted data to the satellite controller 180 through the IPMB interface (i.e., the satellite control interface). If the data sent to the satellite controller 180 does not request for a response, the procedures ends.

In certain embodiments, when the data is a request command to certain information of the satellite controller 180, at procedure 450, the satellite controller 180 retrieves the requested information, and sends the requested information back to the IPMI stack 130 through the IPMB interface (i.e., the satellite control interface). At procedure 460, the IPMI stack 130 receives the information from the satellite controller 180.

At procedure 470, the IPMI stack 130 sends the information to the internal communication module 160. At procedure 480, the internal communication module 160 may construct a response to the bridging command based on the information. At procedure 490, the internal communication module 160 sends the response to the management service in response to the bridging command.

In a further aspect, the present disclosure is related to a non-transitory computer readable medium storing computer executable code. The code, when executed at one or more processer, may perform the method as described above. In certain embodiments, the non-transitory computer readable medium may include, but not limited to, any physical or virtual storage media. In certain embodiments, the non-transitory computer readable medium may be implemented as the storage device 116 of the server management device 110 as shown in FIG. 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a server management device, comprising a processor and a storage device storing an Intelligent Platform Management Interface (IPMI) stack, a management service module, and computer executable code, wherein the management service module, when executed at the processor, is configured to provide a corresponding management service; and
at least one satellite controller communicatively connected to the server management device through a satellite control interface, wherein a satellite communication is established between the IPMI stack and the at least one satellite controller through the satellite control interface;
wherein the computer executable code, when executed at the processor of the server management device, is configured to:
define an internal system interface, and configure the internal system interface to establish an inter-process communication (IPC) channel between the IPMI stack and the management service using the internal system interface; and
perform an internal communication between the IPMI stack and the management service through the IPC channel to enable a bridging communication between the management service and the at least one satellite controller via the IPMI stack by the internal communication and the satellite communication,
wherein the computer executable code comprises an internal communication module configured to perform the internal communication between the IPMI stack and the management service through the IPC channel, and the bridging communication comprises:
receiving, by the internal communication module, a bridging command directed to the at least one satellite controller from the management service, wherein the bridging command includes first data to be directed to the at least one satellite controller;
extracting, by the IPMI stack, the first data from the bridging command; and
transmitting, by the IPMI stack, the first data to the satellite controller through the satellite control interface;
receiving, by the IPMI stack, second data in response to the first data from the satellite controller through the satellite control interface;
constructing, by the internal communication module, a response to the bridging command based on the second data; and
transmitting, by the internal communication module, the response to the management service in response to the bridging command.

2. The system as claimed in claim 1, wherein the server management device is a baseboard management controller (BMC).

3. The system as claimed in claim 1, wherein the satellite control interface is an Intelligent Platform Management Bus (IPMB) interface.

4. The system as claimed in claim 1, wherein the internal system interface is a Unix domain socket (UDS) or an IPC socket.

5. The system as claimed in claim 1, wherein the management service is a service providing at least one out-of band (OOB) functionality for the server management device.

6. The system as claimed in claim 5, wherein the management service is a web server service, a keyboard, video and mouse (KVM) service, a Common Information Model (CIM) service, a Systems Management Architecture for Server Hardware (SMASH) service, or a combination thereof.

7. The system as claimed in claim 1, wherein the computer executable code further comprises:
a configuration module configured to define the internal system interface and configure the internal system interface to establish the IPC channel.

8. The system as claimed in claim 7, wherein the configuration module is configured to configure the internal system interface to establish IPC channel by referencing the IPC channel with an IPC file, such that the IPC channel is accessible by the IPMI stack and the management service.

9. The system as claimed in claim 8, wherein the IPC channel is accessible by the IPMI stack and the management service as a file system, wherein the file system includes a first file location representing the IPMI stack and a second file location representing the management device.

10. A method for performing internal system interface-based bridging support in a server management device, the method comprising:
defining, by the server management device, an internal system interface, and configuring the internal system interface to establish an inter-process communication (IPC) channel between an Intelligent Platform Management Interface (IPMI) stack and a management service within the server management device using the internal system interface, wherein the management service is provided by executing a management service module in the server management device; and performing, by the server management device, an internal communication between the IPMI stack and the management service through the IPC channel to enable a bridging communication between the management service and at least one satellite controller via the IPMI stack by the internal communication and a satellite communication between the IPMI stack and the at least one satellite controller, wherein the at least one satellite controller is communicatively connected to the server management device through a satellite control interface, and the satellite communication is established between the IPMI stack and the at least one satellite controller through the satellite control interface; and wherein the bridging communication comprises:

receiving, by an internal communication module of the server management device, a bridging command directed to the at least one satellite controller from the management service, wherein the bridging command includes first data to be directed to the at least one satellite controller;

extracting, by the IPMI stack, the first data from the bridging command;

transmitting, by the IPMI stack, the first data to the satellite controller through the satellite control interface;

receiving, by the IPMI stack, second data in response to the first data from the satellite controller through the satellite control interface;

constructing, by the internal communication module, a response to the bridging command based on the second data; and transmitting, by the internal communication module, the response to the management service in response to the bridging command.

11. The method as claimed in claim 10, wherein the server management device is a baseboard management controller (BMC), the satellite control interface is an Intelligent Platform Management Bus (IPMB) interface, and the internal system interface is a Unix domain socket (UDS) or an IPC socket.

12. The method as claimed in claim 10, wherein the management service is a service providing at least one out-of band (OOB) functionality for the server management device, and wherein the management service is a web server service, a keyboard, video and mouse (KVM) service, a Common Information Model (CIM) service, a Systems Management Architecture for Server Hardware (SMASH) service, or a combination thereof.

13. The method as claimed in claim 10, wherein the internal system interface is configured to establish IPC channel by referencing the IPC channel with an IPC file, such that the IPC channel is accessible by the IPMI stack and the management service.

14. The method as claimed in claim 13, wherein the IPC channel is accessible by the IPMI stack and the management service as a file system, wherein the file system includes a first file location representing the IPMI stack and a second file location representing the management device.

15. A non-transitory computer readable medium storing an Intelligent Platform Management Interface (IPMI) stack, a management service module, and computer executable code, wherein the computer executable code, when executed at a processor of a server management device, is configured to:

define an internal system interface, and configure the internal system interface to establish an inter-process communication (IPC) channel between the IPMI stack and a management service within the server management device using the internal system interface, wherein the management service is provided by executing the management service module at the processor of the server management device; and perform an internal communication between the IPMI stack and the management service through the IPC channel to enable a bridging communication between the management service and at least one satellite controller via the IPMI stack by the internal communication and a satellite communication between the IPMI stack and the at least one satellite controller, wherein the at least one satellite controller is communicatively connected to the server management device through a satellite control interface, and the satellite communication is established between the IPMI stack and the at least one satellite controller through the satellite control interface; and wherein the computer executable code comprises an internal communication module configured to perform the internal communication between the IPMI stack and the management service through the IPC channel, and the bridging communication comprises:

receiving, by the internal communication module, a bridging command directed to the at least one satellite controller from the management service, wherein the bridging command includes first data to be directed to the at least one satellite controller;

extracting, by the IPMI stack, the first data from the bridging command; and transmitting, by the IPMI stack, the first data to the satellite controller through the satellite control interface;

receiving, by the IPMI stack, second data in response to the first data from the satellite controller through the satellite control interface;

constructing, by the internal communication module, a response to the bridging command based on the second data; and transmitting, by the internal communication module, the response to the management service in response to the bridging command.

16. The non-transitory computer readable medium as claimed in claim 15, wherein the server management device is a baseboard management controller (BMC), the satellite control interface is an Intelligent Platform Management Bus (IPMB) interface, and the internal system interface is a Unix domain socket (UDS) or an IPC socket.

17. The non-transitory computer readable medium as claimed in claim 15, wherein the management service is a service providing at least one out-of band (OOB) functionality for the server management device, and wherein the management service is a web server service, a keyboard, video and mouse (KVM) service, a Common Information Model (CIM) service, a Systems Management Architecture for Server Hardware (SMASH) service, or a combination thereof.

18. The non-transitory computer readable medium as claimed in claim 15, wherein the computer executable code further comprises:

a configuration module configured to define the internal system interface and configure the internal system interface to establish the IPC channel.

19. The non-transitory computer readable medium as claimed in claim 18, wherein the configuration module is configured to configure the internal system interface to establish IPC channel by referencing the IPC channel with an IPC file, such that the IPC channel is accessible by the IPMI stack and the management service.

20. The non-transitory computer readable medium as claimed in claim 19, wherein the IPC channel is accessible by the IPMI stack and the management service as a file system, wherein the file system includes a first file location representing the IPMI stack and a second file location representing the management device.

* * * * *